United States Patent [19]

Lilja et al.

[11] 4,210,315
[45] Jul. 1, 1980

[54] MEANS FOR PRODUCING A SUSPENSION OF A POWDERY SUBSTANCE AND A REACTION GAS

[75] Inventors: Launo L. Lilja; Valto J. Mäkitalo, both of Pori, Finland

[73] Assignee: Outokumpu Oy, Finland

[21] Appl. No.: 961,226

[22] Filed: Nov. 16, 1978

Related U.S. Application Data

[62] Division of Ser. No. 797,505, May 16, 1977, Pat. No. 4,147,535.

[51] Int. Cl.² .............................................. F27B 1/20
[52] U.S. Cl. ................................. 266/182; 266/176; 266/184
[58] Field of Search ............. 266/176, 182, 184, 18 V; 414/160, 199-206

[56] References Cited

U.S. PATENT DOCUMENTS

| | | | |
|---|---|---|---|
| 720,490 | 2/1903 | Ruthenburg | 75/26 |
| 3,190,470 | 6/1965 | Ritter | 266/176 |

FOREIGN PATENT DOCUMENTS 191591  3/1967  U.S.S.R. ................................. 266/184

Primary Examiner—M. J. Andrews
Attorney, Agent, or Firm—Bucknam and Archer

[57] ABSTRACT

A suspension of a powdery substance and a reaction gas is formed by allowing the powdery substance to fall as an annular flow into a reaction space, feeding the reaction gas downwardly to encircle the annular flow of powdery substance, the kinetic energy of the annular flow of descending powdery substance being utilized towards its gradual spreading to the sides with the aid of a sliding surface disposed within the reaction space, so that the flow of powdery substance which has been spread to be laterally directed will meet the reaction gas flow substantially at right angles in the reaction space.

8 Claims, 11 Drawing Figures

MEANS FOR PRODUCING A SUSPENSION OF A POWDERY SUBSTANCE AND A REACTION GAS

This application is a division of application Ser. No. 797,505 filed May 16, 1977, now U.S. Pat. No. 4,147,535.

BACKGROUND OF THE INVENTION

The present invention relates to a process and means for producing a suspension of a powdery substance and a reaction gas by causing the powdery substance to fall as an annular flow into a reaction space and by conducting the reaction gas downwardly encircling the annular flow of powdery substance.

In order to introduce a suspension of reaction gas and powdery substance into a reaction space two different principles have been applied heretofore, according to which the suspension is formed either before the injecting means or by the aid of the injecting means itself. The first procedure is employed in conventional coal dust burners of coal dust firing installations or in such metallurgical equipment where the pneumatically transported finely divided ore or concentrate is blown, together with its carrier gas, directly into the reaction vessel. When applying this method, the blowing speed at the introduction has to be adjusted to be such that no backfiring of the reactions can occur.

In the event, however, that high degrees of preheating are used the formation of the suspension must be performed as close to the reaction space as possible. The same is true in cases in which the suspension that is being formed is highly reactive, as is for instance the mixture of metallurgical sulfide concentrate and technical oxygen. It is indicated in such cases to perform the suspension not until in the reaction space itself.

The object of the present invention is to provide a suspension forming process wherein first contact between the reacting substances takes place in the reaction space itself, whereby the process is suitable to be used also in the suspension of highly reactive substances.

The literature contains numerous presentations of how a suspension is fed. The majority thereof deals either with the direct introduction by blowing of a pneumatically transported fine solid or with apparatus wherein a suspension jet is formed in ejector-like fashion with the aid of pressure pulsations generated in the reaction gas and is blown into the reaction space. Such a jet constitutes a cone having an aperture angle on the order of 15 to 20 degrees and wherein the solid content is highest in the centre of the jet. The shape of the distribution is primarily dependent on the properties of the solid substance and on the flow velocity of the suspension. In the commonly used case of a cylindrical reaction space, such as the reaction shaft of a flash smelting furnace, the admission of a conical jet of this type is low, as will be demonstrated in greater detail later on.

There are in principle two ways in which the admission may be improved: it is possible to increase the number of supply points, or to form several cones, or one may increase the aperture angle of the jet by imparting to the gas a velocity component directed sideways. In case the suspension is constituted by reactive substances, it is advantageous to form the suspension not until in the immediate vicinity of the reaction space or most advantageously in the reaction space itself.

The proportion of solid matter in the mass of the suspension is usually significant, particularly so in metallurgical applications. Depending on the thickness of the roof lining of the reaction space, on the placement of the supply means and other similar circumstances, the solid matter has to pass through a distance of fall before it reaches the point where the suspension is formed and therefore its vertically directed quantity of motion is significant. In the suspension forming methods of prior art the solid matter tends by this quantity of motion and by its mass inertia to damp the horizontal velocity component possessed by the gas and thereby to cause a narrowing of the jet.

SUMMARY OF THE INVENTION

According to the present invention the falling motion energy of the solid matter is utilized in rendering the suspension jet broader in that with the aid of a suitably shaped surface the direction of motion of the solid matter is deflected to the transversal with reference to the gas. In this way an increase of the aperture angle of the jet is achieved no matter whether the gas has or has not a horizontal velocity component. When the said surface is placed centrally with regard to the solid matter jet, the suspension jet that is produced will have the shape of a paraboloid, as has been found in experiments carried out by us, whereby the admission of the reaction space is essentially higher than that of a conical jet. The distribution of the solid matter may be regulated by means of appropriately placed dispersion gas jets. These are advantageously gas jets discharging from nozzle holes located below the terminal edge and transversal to the gas flow forming the suspension, the arrangement of these jets being deducible by a person skilled in the art or simply determinable by experiment.

The object of the invention therefore is to provide a procedure and means for forming a turbulent suspension jet discharging into a reaction vessel and for its broadening by utilizing the kinetic energy of the jet of solid matter going into the suspension, and possibly dispersion gas jets, in order that an improved utilization of the volume of the reaction vessel might be achieved.

According to the invention the forming of the suspension jet and its broadening in the reaction space itself is carried out with the aid of means disposed in its cover, in the following way, for instance.

With the fine-divided solid substance a falling jet is produced, applying a procedure known in prior art, and this jet is caused to slide along a surface where the curvature of the side line parallel to the vertical plane in the optimum case continuously increases in the direction in which the solid slides and where the terminal edge in the direction of sliding of the solid substance is horizontal. Below the terminal edge, nozzle holes have been provided, the gas jets emitting therefrom being caused to meet the solid substance jet flowing over the terminal edge and which has been directed by the sliding surface to be substantially horizontal. The reaction gas is caused to flow downwardly past the terminal edge, whereby the solid matter is admixed thereto. The mixing is enhanced by the aid of dispersion jets, which may be used at the same time to regulate the solid matter distribution. The forming of suspension is fast and efficient and, as will be shown later, the suspension jet that is formed is at once broad at its top and fills the reaction space efficiently. This enables the reaction space to be constructed smaller even initially, or the capacity of an existing apparatus may be raised. As a result of the efficient forming of suspension and of the adjustable feature of the broadening efficiency, the suspension forming procedure of the invention is advantageous with low capacities too, in which case owing to a low gas velocity the ejector principle cannot produce any good suspension. When the present invention is being applied a low reaction gas velocity can be chosen even initially, whereby several advantages are gained, that is, the suspension discharge aperture into the reaction space will be larger, resulting in a better admission of the reaction space also by this effect, the pressure loss of the reaction gas is reduced, and in the shaping of ducts and passages attention can be paid to considerations other than those of the suspension forming process.

Since the forming of the suspension takes place in the reaction space itself, there is no fear of any destructive effect on the walls of the reaction gas passages by suspension that has reacted partly, not even in difficult situations such as those of high oxygen enrichment and preheating.

In the following the forming of a free suspension jet shall be discussed which takes place by the ejector principle, from a downwardly directed gas jet and a coherent flow of finely divided solid matter falling centrally into same, this latter flow having a velocity on the order of 0 to 10 meters per second.

A free gas jet forms, as is well known, a cone with about 15° to 20° cone angle.

If the solid matter jet and the gas have low velocities, the solid matter jet remains coherent and no suspension is formed. In that case the solid matter exerts little effect on the gas jet.

If the flow velocity of the gas is raised to be sufficiently higher than the velocity of fall of the first-mentioned solid matter jet, possibilities exist for a suspension to form. In that case for acceleration of the solid matter a gas pulse is employed, whereby its velocity in the suspension jet is reduced and the jet tends to expand. The own downwardly directed impulse of the solid matter tends to counteract the expansion.

This detrimental effect of the solid matter may be attenuated or eliminated by imparting to it a horizontal velocity component.

Quite naturally the change of impulse of the gas jet required in view of accelerating the solid matter is greater if the solid matter has initially no, or only a very small, downwardly directed velocity component.

The expansion, just described, of the suspension jet due to mass increase naturally cannot take place if the walls of the flow passage impose an obstacle: the suspension jet discharging from an unrestricted flow passage has substantially the shape of a free gas jet.

DESCRIPTION OF THE INVENTION

Figure 1:
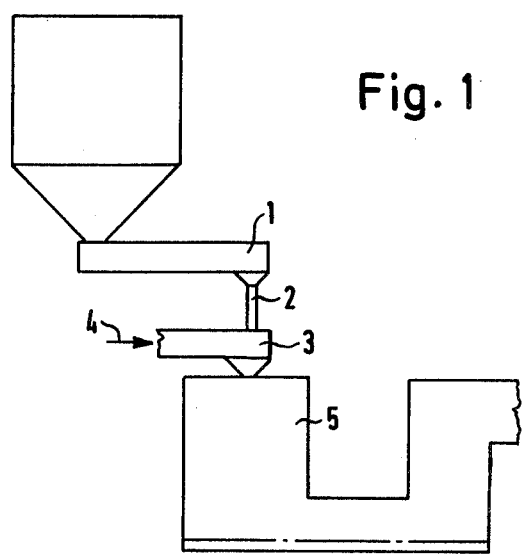
FIG. 1 presents schematically an application of our invention—a flash smelting furnace.
Figure 2:
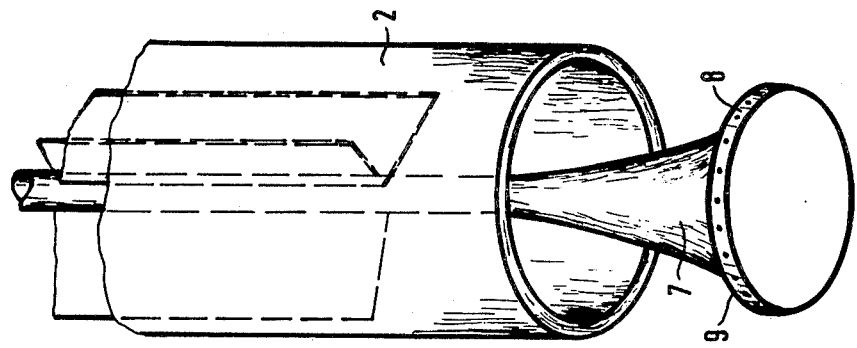
FIG. 2A shows a vertical section through a preferred embodiment of the invention.
FIG. 2B shows in greater detail the lower end of the device illustrated by FIG. 2A, in oblique isometric projection.
Figure 2:
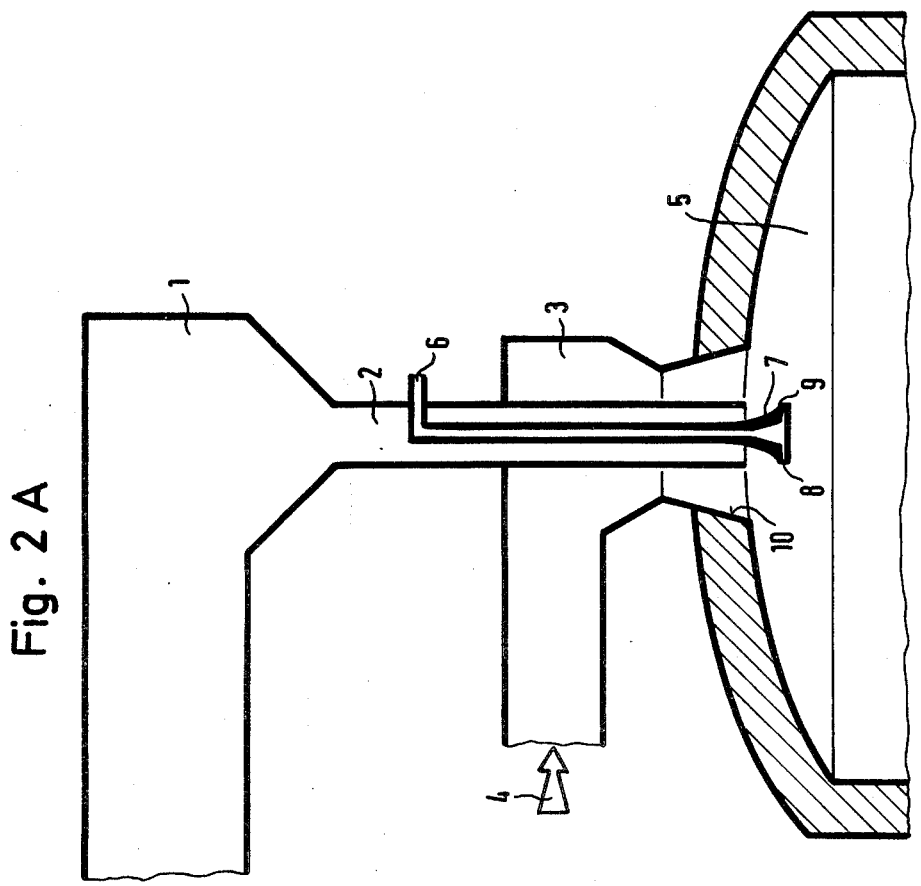
Figure 3:
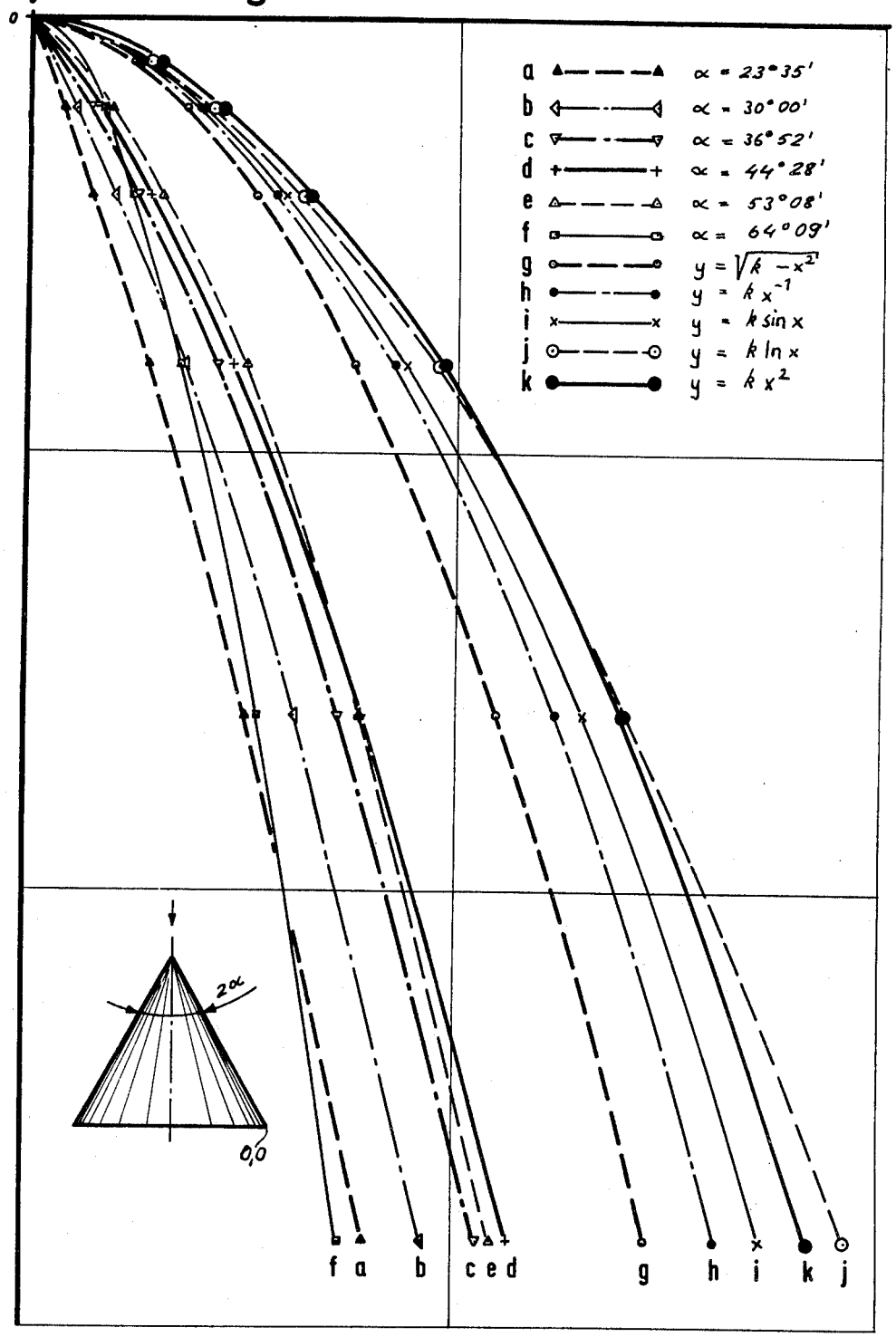
FIG. 3 shows results obtained in experiments with various shaped bodies (curves a, b, c, d, e and f obtained with straight cones, and curves g, h, i, j and k with shaped bodies according to our invention)
Figure 4:
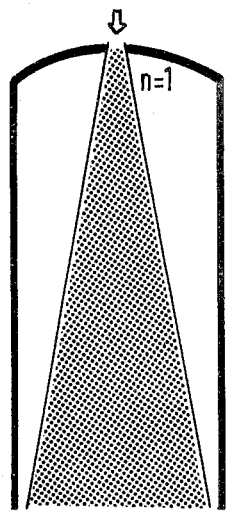
FIG. 4A shows schematically the section through a vertical cylindrical reaction space and through the conical suspension jet blown centrally thereinto.
FIG. 4B shows a view similar to that of FIG. 4A, but in this case the number of suspension jets is $n=4$.
FIG. 4C shows a view similar to that of FIG. 4B, but now $n=7$.
FIG. 4E shows graphically the utilization of the reaction space in the cases of FIGS. 4A, 4B, 4C and 4D.
Figure 4:
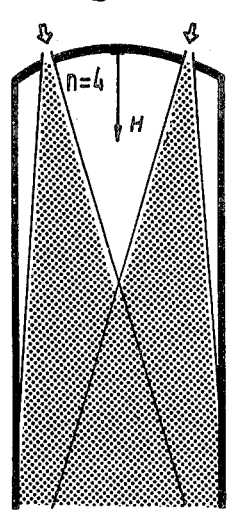
Figure 4:
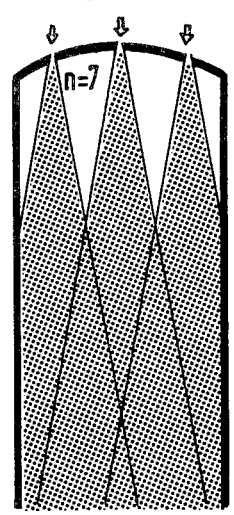
Figure 4:
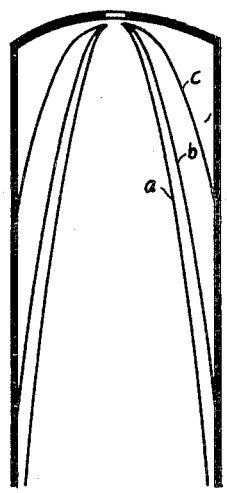
Figure 4:
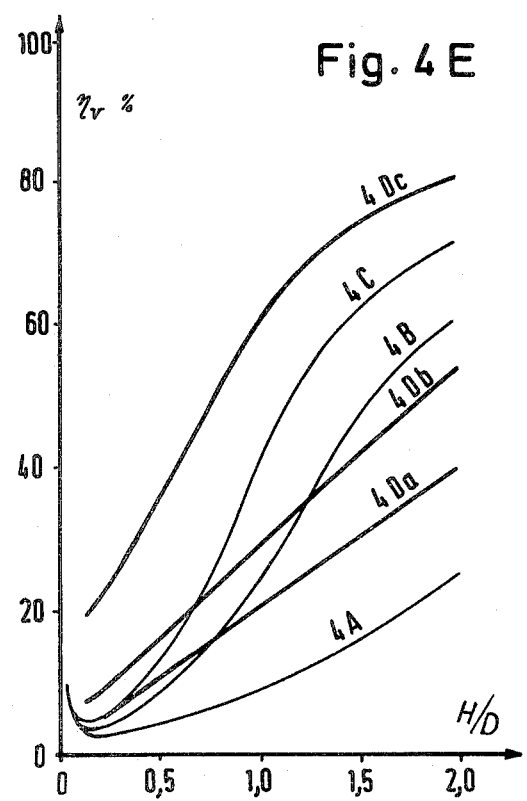

In FIG. 1, the reference numeral 1 indicates a conveyor by the aid of which the powdery substance is transported to the top end of the pouring tube 2, resulting in the function that powdery substance descends all the time through the pouring tube which, as is visible in greater detail in FIG. 2A, extends through the reaction gas supply aperture 10 at the top end of the reaction space 5. Reaction gas 4 is supplied from the duct 3 through the aperture 10, encircling the pouring tube 2, into the reaction space 5.

As can be read from FIGS. 2A and 2B, within the pouring tube 2 a smaller diameter tube 6 has been coaxially disposed, this latter tube extending downwardly through the supply aperture of the pouring tube 2 and expanding like a horn, in view of creating a curved sliding surface 7 in order to disperse and deflect the flow of failing powdery substance. The sliding surface has an encircling terminal edge 9, which is directed substantially sidewardly at right angles. The horn-like part is closed at its lower end and on its circumference a plurality of small, preferably radial holes 8 have been provided to the purpose of jetting the dispersing gas conducted through the pipe 6 into the horn-shaped lower part, against the powdery substance discharging from the terminal edge 9 with the object of dispersing it.

The rotationally shaped horn-like sliding surface 7 has a diameter at the level of the terminal edge 9 only slightly less than the inner diameter of the supply aperture of the pouring tube 2, causing the greater part of the powdery substance to fall onto the sliding surface 7, for the direction of motion of the powdery substance to be changed from vertical to substantially horizontal.

The gas flow supplied through the pipe 6 enhances the mixing of the powdery substance with the flow of reaction gas, and at the same time it cools the horn-like part projecting into the reaction space. The pouring tube 2 is cooled too, although this has not been specifically shown. The discharge aperture of the pouring tube 2 may also expand downwardly e.g. with the same curvature as that of the sliding surface 7 on the horn-like part.

The ratio of the inner diameter of the pouring tube 2 and the diameter of the sliding surface measured at the terminal edge 9 is advantageously between 0.5 and 1.25. The sliding surface 7 has preferably a rotational shape and its curvature will advantageously progressively increase towards the terminal edge 9. The contour of the cross section through the horn-like part at right angles to the central axis may also be undulating or angular, but preferentially it should be hard and smooth. The ratio between the height of the sliding surface 7 and the average radius measured in the plane of the terminal edge 9 is advantageously between 4 and 6.

The dispersion means of the invention is advantageously placed in the reaction space 5 at such height that the terminal edge 9 will be positioned as much below the roof of the reaction space 5 as is its diameter, in order that none of the dispersed suspension jet might hit the roof of the reaction space 5 or the walls of the aperture 10.

In order to enhance the distribution of the powder substance the dispersion nozzle or merely its central horn-like part may be rotated about their vertical axis in order to utilize centrifugal action in the spreading of the powder.

The invention is more closely described below with the aid of examples.

EXAMPLE 1

In order to change the direction of the quantity of motion possesses by the falling jet of finely divided solid matter, the solids may be arranged to hit a stationary surface, such as a cone surface for instance. In view of clarifying the effect of the apex angle of the cone a test series was carried out wherein Zn powder (80% $<140$ $\mu$m) was dropped in an unrestricted space from a height of 0.4 m onto a smooth-surfaced cone made of brass, in such manner that the apex of the cone coincided with the centre of the 60 mm diameter powder jet.

The Zn powder formed a paraboloid-shaped curtain, the enveloping curve of the powder particles' paths of motion presenting at different apex angles of the cone the vertical sections shown by the curves a, b, c, d, e and f in FIG. 3. The terminal edge of the cone is positioned at the origin. The displacement of the solid matter in horizontal direction on the surface of the cone was the same in all tests.

It is observed that the spreading efficiency was highest when the apex angle of the cone was between 70° and 100°.

EXAMPLE 2

Since it is favourable in view of a good degree of utilisation of the reaction space if the jet has the greatest possible width at the top, the solid matter when it leaves the spreading surface should have a direction as close the horizontal as possible. This condition is met by the spreading surface if its contour in the vertical plane curves outwardly. The simplest shape of this type, a circular arc, yielded when tested as in Example 1, a result which was distinctly superior to the results obtained with straight cones (FIG. 3, curve g). But even better results were obtained with surfaces having a curvature which increases progressively in the direction of travel of the solid matter grains.

The results of experiment have been shown in FIG. 3—curves h, i, j and k. The conditions of test and the horizontal displacement of the solid matter flow were as in Example 1.

It is seen from the results that the best result (enveloping curve with largest width at the top) was obtained with a surface having a vertical section contour line conforming to the mathematical equation $y=kx^n$.

EXAMPLE 3

Sand, having grain size 80% $<0.5$ mm, was dropped in a free jet from a 100 mm dia. tube onto a shaped dispersion body made of brass and having a vertical section contour line with the shape $y=kx^n$. The mass flow rate of the sand was 25,000 kg per hr. The sand flowing over the terminal end of the shaped dispersion body constituted a paraboloid-shaped curtain with about 2 m diameter at a level 2 m below the terminal edge. The thickness of the curtain at this point was about 150 to 200 mm.

When air was blown through apertures placed below the terminal edge of the shaped body, in horizontal direction and at 300 $m^3$/hr, the breadth of the paraboloid at the first-mentioned height amounted to about 5 m. The distribution of the sand in the horizontal plane could be altered by changing the arrangement of the jets discharging from the apertures.

EXAMPLE 4

In order to determine the admission ($n_v$) of a vertical, cylindrical reaction space (D=diameter, H=distance from roof), such as the reaction shaft of a flash smelting furnace, the fraction (in percent) of the total reaction space volume filled by a suspension jet (or jets) having a given area at entry was calculated. A similar consideration is naturally valid for different shaped reaction spaces as well.

The result referring to ejector-type forming of the suspension is presented in FIGS. 4A, 4B, 4C and 4E (curve). It is clearly noticed that to achieve a good admission it is necessary to use numerous jets. FIGS. 4D and 4E (curve) present the corresponding results with regard to suspension jets a to c modified as taught by the present invention. The jets meet the wall of the reaction space at the same heights as in the instance of conical jets.

A circumstance worth notice is the increase in efficiency at comparatively low H/D ratios, because these are involved in apparatus of very high capacities.

EXAMPLE 5

An ejector type double cone burner was used as concentrate burner in a flame smelting furnace. In other respects arrangements as shown in FIG. 1 were made. The dried supply mixture was dropped into the burner with free fall, having a length from the supply means to the lower surface of the flame arch upon the reaction shaft about 3.5 m. The feed rate (Cu concentrates+sand+flue dust quick ash) was 31,500 kg per hr. The volume flow of oxygen-enriched preheated combustion air was 17,700 $m^3$/hr. The diameter of the burner throttling point was 410 mm. At 4 m distance below the lower surface of the flame arch the distribution of solid matter and of melt droplets in the suspension jet was measured with an apparatus elaborated to this end.

The result of measurement (mass/surface area/time) is graphically presented in FIG. 5A. It is observed that the result is consistent with typical ejector-type jet formation, i.e., the cone angle of the jet is about 20°.

EXAMPLE 6

The concentrate burner of Example 5 was modified to operate in accordance with our invention. This was done by installing, according to the principle of FIG. 2, in place of its concentrate tube a Central Jet Distributor with a dispersing shaped body having the shape presented in Example 3. The distance of its terminal edge from the lower surface of the reaction shaft's flam arch was 100 mm. The concentrate jet falling down freely on the shaped body was isolated from the combustion air by means of a water-cooled double jacket tube. From the apertures provided below the terminal edge of the shaped body dispersion and cooling air was blown at a volume flow rate of 88 $m^3$/hr. The distribution of the non-gaseous reaction products was measured similarly as in Example 5.

The result of measurement is seen in FIG. 5B. It is noted that the breadth of the suspension jet has remarkably increased.

Figure 5:
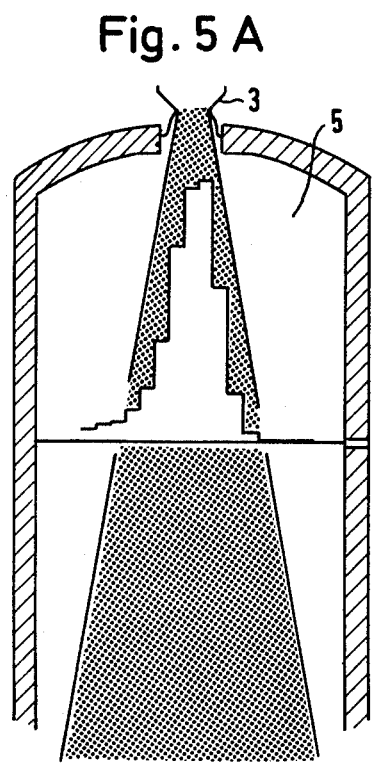
FIG. 5A shows the result of a distribution measurement made in a production furnace, using suspension forming of prior art.
FIG. 5B shows the result of distribution measurement carried out in a production furnace, using the suspension forming procedure of the present invention.
Figure 5:
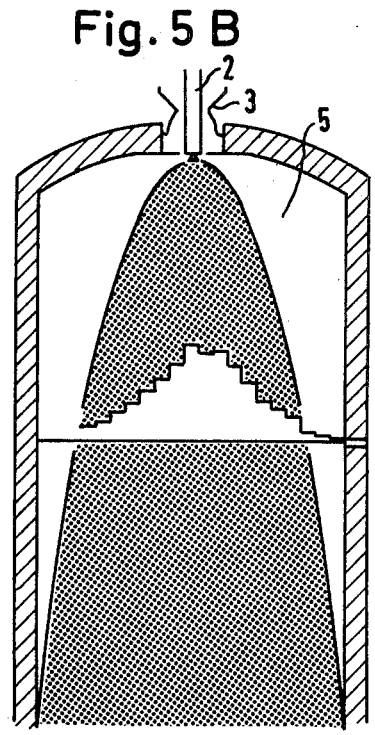

In FIG. 5 the outlines of the suspension jet have been sketched.

It is possible by calculation therefrom to observe that the volume fraction of the reaction space which is utilized has increased to more than double its previous amount.

Another fact deserving notice is the low air flow required for the cooling and dispersion: only 0.5% of the total gas flow.

EXAMPLE 7

In view of clarifying the effect exerted by the quality of the solid matter, the procedure of suspension forming of the invention was tried out in a semi-production scale flash smelting furnace, using for solid: Cu concentrate, Ni concentrate, Pb concentrate, Zn concentrate, and pyrite concentrate.

The production of suspension was efficient and the expansion of the jet compared with the ejector-type case was clearly manifested.

The changes in the quality of the suspension jet resulting from differences in density and grain size of the solid matter could be eliminated by regulating the dispersion gas jets.

With Cu concentrate a case was also tried out in which the reaction gas was technical oxygen and the dispersion gas was air. The high oxygen content did not impede the forming of suspension.

EXAMPLE 8

The concentrate burner of Example 6 was employed in a copper concentrate flash smelting production furnace. The temperature on the inside of the bottom of the hollow dispersion shaped body was measured with a thermocouple. This temperature was found to be during normal operation, when a temperature about 1600 K prevails in the reaction shaft, about 400 K. During breaks in the run the dispersion body could be raised to be protected within the water-cooled pouring tube 2.

The burner was inspected after six months' service. It was found to be in such good operating condition that its use could be immediately continued.

What is claimed is:

1. An apparatus for forming a suspension of a powdery substance and a reaction gas, comprising a first supply tube for the powdery substance adapted to be inserted through the reaction gas entrance aperture in the upper part of a reaction chamber and directed downwardly into the reaction chamber, a second supply pipe for the gas and, extending centrally downwardly from the first supply tube, at least one sliding surface projecting gradually outwardly from its central axis, the terminal edge of which is substantially horizontal, further comprising, below the terminal edge of the sliding surface, one or several substantially horizontally directed apertures for injecting dispersion gas jets into the flow of powdery substance discharging from the sliding surface.

2. The apparatus according to claim 1, in which the sliding surface has rotational symmetry about the central axis of the first supply tube and curves steadily from this central axis outwardly and downwardly towards the encircling terminal edge, which lies at a distance under the discharge aperture of the first supply tube.

3. The apparatus according to claim 2, in which the curvature of the sliding surface in the direction of flow of the powdery substance increases steadily from the substantially vertical tubular outer surface within the supply tube towards the substantially horizontal terminal edge in the reaction chamber.

4. The apparatus according to claim 1, comprising a horn-shaped downwardly directed shaped body having a tubular stem and closed at its lower end and coaxially disposed within the supply tube, the top end of the tubular stem being connected to a source of dispersion gas and having around its closed horn-like lower end a plurality of substantially horizontally directed apertures at equal spacing for injecting dispersion gas towards the flow of powdery substance sliding along the outer surface of the horn-like shaped body and discharging from the terminal edge.

5. The apparatus according to claim 4, wherein the ratio between the inner diameter of the first supply tube and the diameter of the horn-like part at its terminal edge is 0.5 to 1.25.

6. The apparatus according to claim 4, wherein the ratio between the height of the horn-like part and its average radius at the terminal edge is about 4 to 6.

7. The apparatus according to claim 1, in which the terminal edge of the sliding surface or surfaces are rotatable about the longitudinal axis of the first supply tube in order to enhance the spreading of the flow of powdery substance.

8. The apparatus according to claim 1, in which the discharge aperture of the first supply tube is downwardly flaring.

* * * * *